United States Patent [19]

Federhen et al.

[11] Patent Number: 4,955,761
[45] Date of Patent: Sep. 11, 1990

[54] PROCESS FOR PNEUMATICALLY CONVEYING MATERIAL AND APPARATUS FOR CONTROLLING THE FEED OF AIR THEREFOR

[75] Inventors: Bernd Federhen, Siegen; Manfred May, Niederfischbach, both of Fed. Rep. of Germany

[73] Assignee: Alb. Klein GmbH & Co. KG, Niederfischbach, Fed. Rep. of Germany

[21] Appl. No.: 342,245

[22] Filed: Apr. 24, 1989

[30] Foreign Application Priority Data

Jan. 27, 1989 [DE] Fed. Rep. of Germany ....... 3902388

[51] Int. Cl.$^5$ .............................................. B65G 53/66
[52] U.S. Cl. ........................................ 406/12; 406/93; 406/95
[58] Field of Search ................... 406/93–95, 406/11, 12, 14, 15

[56] References Cited

U.S. PATENT DOCUMENTS

| 2,897,005 | 7/1959 | Wiltse | 406/95 |
| 4,002,372 | 1/1977 | Edwards et al. | 406/94 |
| 4,389,143 | 6/1983 | Nadin et al. | 406/95 |
| 4,715,748 | 12/1987 | Krambrock | 406/95 |
| 4,861,200 | 8/1989 | Lubrehusen et al. | 406/95 |

FOREIGN PATENT DOCUMENTS 58-212526 12/1983 Japan ..................................... 406/94

Primary Examiner—Sherman Basinger
Assistant Examiner—Stephen P. Avila
Attorney, Agent, or Firm—Bachman & LaPointe

[57] ABSTRACT

A process and an apparatus for pneumatically conveying material in a tubular conveyor conduit (10) into which pressure gas is introduced from a connecting conduit (12, 12$_a$), are improved in that, in the event of a rise in pressure in the conveyor conduit (10), in the direction of conveying movement (x) upstream of the connecting conduit or the mouth opening (13) thereof, the latter is opened for a feed of air from a secondary conduit (16) under high pressure, and that said feed of air into the conveyor conduit (10) is interrupted upon equalization of the pressure in the conveyor conduit (10) in the region upstream of as well as downstream of the mouth opening (13) of the connecting conduit (12). For that purpose, provided on the connecting conduit (12) is a slider (24) as a control member which closes off the connecting conduit in a normal position and which is arranged in a flow chamber (22) between first and second sensor conduits (46, 47), each of which opens into the conveyor conduit (10) at the other end, at another side of the connecting conduit (12), and is connected by way of a throttle section (40, 41) to the portion (12$_e$) of the connecting conduit (12), that goes to the secondary conduit (16). Valves (50, 52) of a particular configuration are provided in the connecting and sensor conduits (12 and 46, 47).

20 Claims, 2 Drawing Sheets

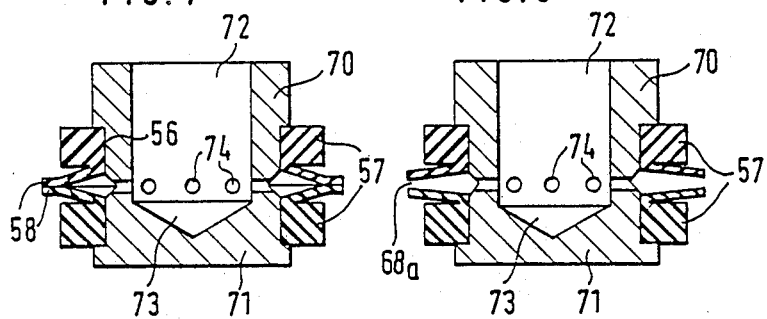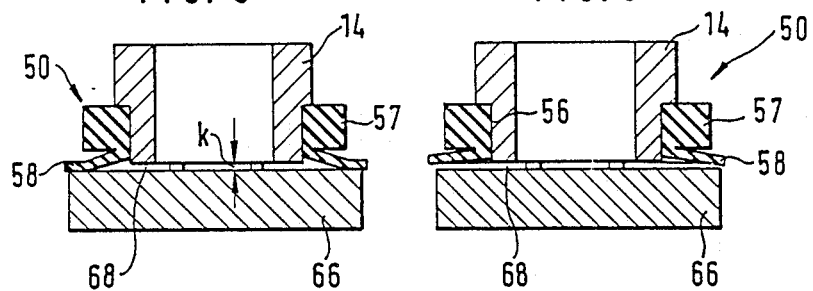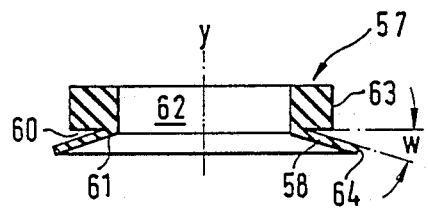

PROCESS FOR PNEUMATICALLY CONVEYING MATERIAL AND APPARATUS FOR CONTROLLING THE FEED OF AIR THEREFOR

DESCRIPTION

The invention relates to a process for pneumatically conveying material in a tubular conveyor conduit into which pressure gas is introduced—preferably transversely with respect to the direction of conveying movement—from a connecting conduit. In addition the invention concerns on the one hand an apparatus for controlling the feed of air from a secondary conduit through a connecting conduit into a conveyor conduit of a pneumatic conveyor installation, wherein the connecting conduit is adapted to be closed by a control member with an energy storage means, in particular a coil spring, and on the other hand an apparatus for closing pipe conduits.

The plug-type conveying procedure which counts among the dense-flow conveying processes is used for transporting bulk material through a pipe as carefully as possible at a low speed and with a low conveying pressure. That conveying process is of particular significance in relation to products which are abrasive or which are sensitive in regard to abrasion wear. As it is possible to achieve high rates of through-put of material with small amounts of air, the level of energy costs remains low.

If only a small amount of conveying air is introduced into the bulk material at the beginning of a conveyor conduit, plugs are automatically formed, which are separated from each other by cushions of air.

In particular at bends in the conveyor conduit however, plugs may be pushed together during the conveying operation, and finally the plugs may attain such a length that the conveyor pressure is no longer adequate to maintain transportation of the material. Added to that is the fact that the pressure for displacing a plug is dependent not only on the length thereof but also on the porosity of the plug; particularly when dealing with bulk materials with a will range of grain sizes, plugs of different levels of porosity occur.

It is known that the level of air pressure required for conveying the plugs through the conveyor conduit can be considerably reduced by feeding air into the plugs. Various apparatuses have been proposed for that purpose.

Thus German patent specification No. 3 323 739 describes a connecting conduit which can be closed by a spring-loaded diaphragm; the diaphragm is disposed between two air chambers and is subjected to the influence of a coil spring. In accordance with the teaching of German patent specification No. 3 323 739, a large number of pneumatically connected shut-off valves with chambers and diaphragms is required; conveying air is additionally introduced into the conveyor conduit only at the locations at which there is in fact a plug, and loosens up the plug. The air is injected into plugs and diaphragms where and when the pressure difference between two adjacent shut-off valves exceeds a predetermined value.

A disadvantage in such an apparatus is that a plurality of shut-off valves are always required, even when the loosening effect of the injected jet of air would be required only at a given location on the conveyor conduit, for example on a bend. In addition the diaphragm must be capable of withstanding the differential pressure between two injection locations, as a result of which the apparatus is sluggish in its reaction.

A further disadvantage is the fact that the system consisting of the diaphragm, spring and air pressure is undamped so that at corresponding pressure conditions the diaphragm does not fully open but begins to flutter. The air which flows from the secondary conduit through the shut-off valve to the conveyor conduit when the valve seat is open additionally acts on the diaphragm so that actuation thereof may not arise just out of the pressure in the conveyor conduit.

In another design configuration as is put forward for example by German patent specification No. 3 024 568, air is introduced into the conveyor conduit—constantly or in a time-cycled fashion—at certain spacings at which there is then no material being conveyed. There is the disadvantage in that arrangement that in that way the amount of conveying air in the conveyor and thus the speed of conveying movement constantly increases and the conveying air cannot be put to optimum use. The attempt has been made, comparatively unsuccessfully, to compensate for the rise in speed, by increasing the size of the conveyor conduit in a stepwise manner.

Having regard to that art, the inventor set himself the arm of providing a process and an apparatus of the kind set forth in the opening part of this specification, with which the recognised disadvantages of the known processes and apparatuses are eliminated.

That problem is solved in that, in the event of a rise in pressure in the conveyor conduit, in the direction of conveying movement, upstream of the connecting conduit which is connected to a secondary conduit at high pressure, the connecting conduit is opened for the pressure gases by an air flow supplied from the conveyor conduit directly to the connecting conduit and, when pressures are equal in the conveyor conduit in the region upstream and downstream of the mouth opening of the connecting conduit, said air feed is interrupted again.

The connecting conduit extends between the conveyor conduit and a secondary conduit which carries a higher pressure than the conveyor conduit, and the connecting conduit is held in a closed condition until the pressure increases in the conveyor conduit, by a control member which is held in a defined normal position by an energy storage means. When the pressure in the conveyor conduit rises, in accordance with the invention, the control member moves against the force of the energy storage means, with a higher pressure in a first sensor conduit, in such a way that pressure air flows from the secondary conduit into the conveyor conduit; when there is equality of pressure in the first sensor conduit and a second sensor conduit, the control member moves back into its normal position. Thus, in accordance with the invention, the control member is a slider or spool which is disposed in the connecting conduit and which closes off the connecting conduit in a normal position and which is arranged in a flow chamber between the first and second sensor conduits which at their other ends each open into the conveyor conduit at different sides of the connecting conduit.

A further feature of the invention provides that each of the sensor conduits is connected by way of a throttle section to the portion of the connecting conduit which leads to the secondary conduit; the throttle sections of narrow cross-section preferably extend parallel to a longitudinal bore in a housing block, the bore forming the flow chamber.

The slider or spool advantageously comprises two piston bodies which are connected at a spacing by a portion of narrower cross-section, in particular by a slider bar, wherein the piston bodies are mounted in the longitudinal bore with axial play determined by the extent of relative displacement of the conduit portions of the connecting conduit, at least one of the piston bodies being supported against the axially operative energy storage means; the portion of narrow cross-section, that is to say the slider bar, opens the communication of the connecting conduit, when the slider is in an open position in which it is moved towards the energy storage means.

It is in accordance with the invention for the mouth openings of the connecting conduit portions which can be separated from each other by the slider or spool, or of transverse bores, which are connected to said connecting conduit portions, in the housing block, to be displaced in the longitudinal bore laterally relative to each other, that is to say radially with respect to the transverse bores, by an axial extent which is less than the axial length of said slider bar, ensuring that there is a clear separation between the normal position of the slider and the open position thereof.

Designing the control member in the form of a housing block with a longitudinal bore for the slider, and throttle bores for the sensor conduits, provides a simple structure which nonetheless is highly effective. The use of a single device of that kind is appropriate to ensure control of the entire conveyor operation. The sensor conduits which open into the conveyor conduit at different spacings at respective sides of the connecting conduit represent parts of a branch conduit from the conveyor conduit, in contrast to the known state of the art. The branch conduit crosses the connecting conduit outside the longitudinal bore, but is also connected with the ends thereof, to carry air therein.

An aspect of particular significance in regard to opening and closing the conduits is a valve which is arranged upstream in the direction of flow of the mouth opening locations of the connecting conduit and/or the sensor conduit or conduits; the valve has an elastic lip which is associated with a conveyor gap and which opens or closes same in dependence on pressure. Protection is claimed in respect of that valve independently of the above-described process and the apparatus therefor.

The valve is a valve for controlling the flow of a fluid from a first chamber at high pressure to a second chamber at low pressure, for distributing the fluid in the last-mentioned chamber or for securely and permanently closing off an undesired flow from the conveyor conduit to the accompanying conduit when the pressure in the latter was to be reduced below that of the conveyor conduit, even when the fluid contains foreign bodies.

In commercially available non-return valves with a spring-loaded piston member, foreign bodies stick to the rigid sealing surfaces and give rise to leaks and difficulties in movement of the moving components. For that reason they require a high opening pressure and do not reliably close in the other direction of flow. They are expensive to produce. The fluid flowing therethrough is not distributed over a large area. In regard to those deficiencies, a remedy is afforded by a valve in which an elastic lip on a ring which is generally V-shaped in cross-section opens or closes the fluid flow path.

In a particular embodiment of that valve the V-shaped ring is carried on a body with flow ducts and bears against the elastic lip of a second such ring or against a fixed surface.

If the pressure in the first chamber is higher than t pressure in the second chamber, the flowing fluid lifts the sealing lips and the fluid is distributed at the periphery of the lips. The lips flutter as a result of the flow and thus loosen any foreign bodies clinging thereto.

If the pressure in the second chamber is higher than the pressure in the first chamber, it supports the sealing force of the sealing lips.

What are known as V-rings have found to be highly suitable for use as the sealing element. Such rings are used as seals in relation to the radial movement of shafts at pressure-less locations.

The ring of the valve according to the invention with its lip which is inclined with respect to a radial plane is formed from wear-resistant elastomer materials. The valve of that design configuration can now be used in accordance with the invention for example as an air distribution means in fluidisation devices in the field of dust storage containers or pneumatic pressure vessel conveyors and as a non-return valve in pneumatic control systems.

By virtue of that valve, in the apparatus as set forth in claim 2, a flow from the conveyor conduit to the accompanying conduit is reliably prevented. For, it has been found that, when a plurality of apparatuses for controlling the feed of air, with a common secondary conduit, are arranged over the course of a conveyor conduit, the function thereof can be adversely affected; the pressure in the conveyor conduit drops from the beginning thereof towards its end. If an apparatus at the end of the conveyor conduit opens simultaneously with an apparatus in the region of the beginning of the conveyor conduit, then the pressure obtaining at the end of the conveyor conduit may fall away; in the region of the beginning of the conveyor conduit, air can flow from the conveyor conduit through the apparatus into the accompanying conduit. When that happens, filters which are provided in that arrangement become clogged with fine dust.

Further advantages, features and details of the invention will be apparent from the following description of a preferred embodiment and with reference to the drawing in which:

FIGS. 5 and 6 show details on an enlarged scale from FIG. 2 with a sealing lip in two mutually different operating positions;

FIG. 7 is a view in cross-section through an elastic member from FIGS. 5 and 6; and FIGS. 8 and 9 show another detail with elastic members in two operating positions.

Figure 2:
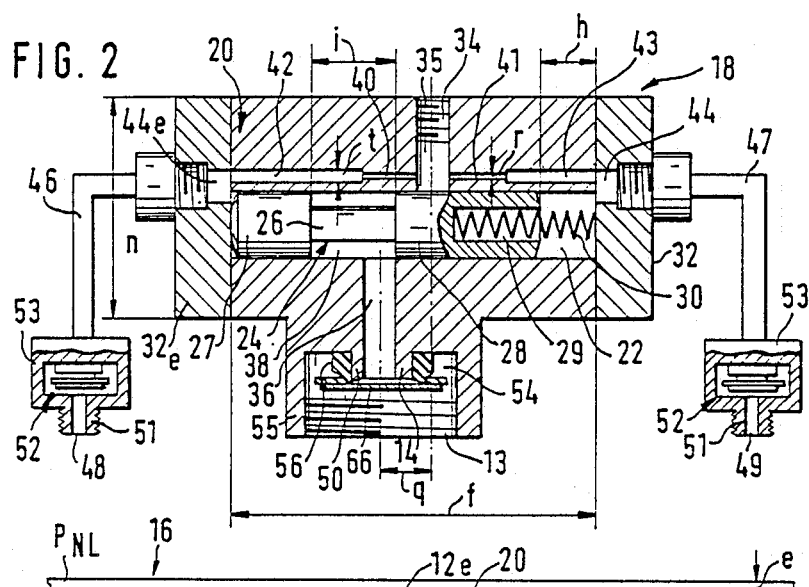
FIG. 2 is a view in longitudinal section through the control member, on an enlarged scale in comparison with FIG. 1.

Reference numeral 10 denotes a conveyor conduit of a diameter d for bulk material S which is moved in the direction indicated by the arrow x. Extending at a right angle from the conveyor conduit 10 is a connecting conduit 12, the mouth opening of which is indicated at 13 in FIG. 1 and which at the other end is connected to a secondary conduit 16 by a portion $12_e$, by way of an interposed control member 18. In this case the diameter e of the secondary conduit 16 approximately corresponds to one fifth of the diameter d of the conveyor conduit 10.

The control member 18 has a housing block 20 of a length f and a width n which is shorter than same, with a longitudinal bore 22 which extends in the longitudinal direction, for a slider or spool 24. The slider or spool 24 comprises two stud-like piston bodies 27 and 28 which are connected by an axial slider bar 26. One of the piston bodies 27, 28 is axially bored and in a blind bore 29 accommodates one end of a coil spring as an energy storage means 30. The spring force of the energy storage means 30 or coil spring can be varied by means of an adjusting screw (not shown).

The coil spring 30 projects out of the piston body 28 and bears with its free end against an end plate 32 which closes off the longitudinal bore 22 and which is fixed to the housing block 20. A corresponding end plate $32_e$ covers over the other end of the longitudinal bore 22.

Figure 1:
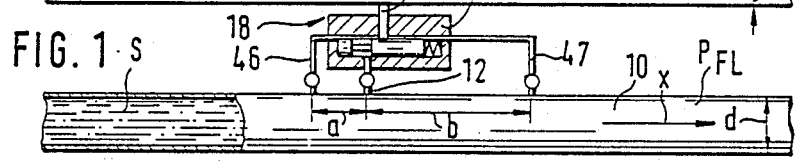
FIG. 1 is a diagrammatic view in longitudinal section through an apparatus according to the invention with a control member in the normal position thereof.

In the normal position of the slider 24, as shown in FIGS. 1 and 2, the piston body 28 which accommodates the coil spring 30 is disposed at a spacing h with respect to the adjacent end plate 32 and masks a transverse bore 34 which extends upwardly in FIG. 2 from the longitudinal bore 22. The portion $12_e$ of the connecting conduit leading to the secondary conduit 16 is connected to the screwthread 35 in the transverse bore 34. A second transverse bore 36 extends with axis parallel to the transverse bore 34, and displaced by a distance q, between the longitudinal bore 22 and the connecting conduit portion 12 which is directed towards the conveyor conduit 10.

A particularly suitable form of the slider 24 involves lapped metal sliders without soft seals, which already move at pressures of 2 KP (Kilopascals) so that the desired differential pressure for the shift operation is determined by the force of the energy storage means. It will be appreciated that it is also possible to use sliders or spools with soft seals or rolling diaphragms.

In the normal position of the slider 24 the transverse bore 36 opens into an annular chamber 38 which is defined by the longitudinal bore 22 and the axial slider bar 26; the transverse bores 34 and 36 are thus separated from each other in that position by the piston body 28.

Figure 4:
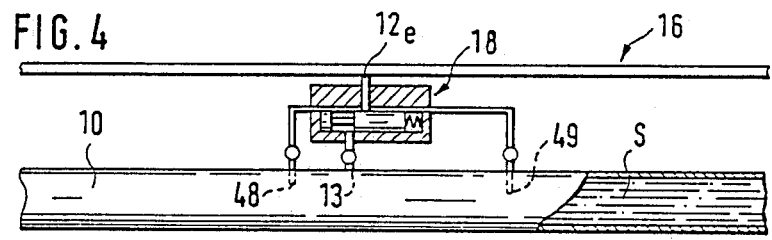

Narrow ducts of a diameter r of preferably 1 mm extend as throttle sections 40 and 41 from the upper transverse bore 34 on both sides thereof, in parallel relationship to the longitudinal bore 22. The throttle sections 40 and 41 each go into an axial bore 42 and 43 of larger diameter t. The bores 42 and 43 each communicate by way of a connecting chamber 44 and $44_e$ respectively with $f + = t$ and second sensor conduits 46 and 47 which connect to the conveyor conduit 10 at connecting locations 48 and 49 at different spacings a and b respectively with respect to the mouth opening 13 of the connecting conduit 12 (see FIGS. 1 and 4).

Figure 3:
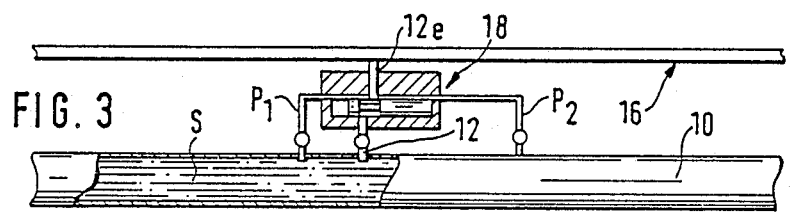
FIGS. 3 and 4 show the apparatus of FIG. 1 in two operating positions different from that shown in FIG. 1.

The air pressure $P_{NL}$ obtaining in the secondary conduit 16 is usually higher than the pressure $P_{FL}$ in the conveyor conduit 10 which, as described, is separated from the secondary conduit 16 by virtue of the piston body 28 in the normal position of the slider 24. If for example due to a plug S which approaches in the conveyor conduit 10, the pressure $P_1$ in the first sensor conduit 46 rises—the sensor conduit 46 is connected on the one hand to the upper portion $12_e$ of the connecting conduit by way of its throttle section 40 and on the other hand to the longitudinal bore 22 by way of the connecting chamber $44_e$ —, then the slider or spool 24 moves in the direction of conveying movement x against the force of the coil spring 30 until the annular chamber 38 embraces both transverse bores 34 and 36 and therewith both portions $12_e$, 12 of the connecting conduit; pressure air $P_{NL}$ flows from the secondary conduit 16 into the conveyor conduit 10 (FIG. 3).

When the plug S which is acted upon by compressed air has passed the mouth opening 13 of the connecting conduit 12 and the mouth opening 49 of the second sensor conduit 47, the pressure in the two sensor conduits 46 and 47 is equalised again and the slider or spool 24 slides back into its normal position.

A very small amount of air flows through the sensor conduits 46 and 47, that air being taken from the secondary conduit 16 and being determined in regard to its quantity by the throttle sections 40 and 41.

As shown in FIG. 2, valves 50 and 52 are fitted between the transverse bore 36 or the sensor conduits 46, 47 on the one hand and on the other hand the mouth opening locations 13 or 48, 49 at which the air to produce the loosening effect or the air which is passed through the throttle sections 40 and 41 is introduced, the valves 50 and 52 being provided inter alia to prevent particles of dirt from passing into the longitudinal bore 22 or reaching the slider or spool 24 when the apparatus is shut down.

The valve 50 on the connecting conduit 12 is disposed in the interior 54 of a tubular connecting portion 55 and, as shown in FIGS. 5 and 6, comprises in a shoulder-like step or recess 56, a pressure ring 57 which embraces the end 14 of the connecting conduit 12, the ring having an outwardly inclinedly projecting annular lip 58. It is separated from the elastic ring 57 by a wedge-shaped gap 60 in such a way that its pivotal connecting location 61 is adjacent the inside surface 62 of the ring. The outer edge 64 of the lip is outside the outside surface 63 of the ring. In addition, in the closed position, as shown in FIGS. 1 and 5, the annular lip bears against a transverse plate 66 which is associated at a spacing K with the end 14 of the connecting conduit 12, while in the open position as shown in FIG. 6, it opens an annular gap 68.

The ring 57 is formed integrally from wear-resistant elastomeric materials, with its annular lip 58 which is inclined at an angle w in the direction of flow as indicated at y. Another valve 52 is only indicated in FIG. 1 at the ends of the sensor conduits 46 and 47, with its valve housing 53 which includes the tubular connecting portion 51.

The end 70 of the sensor conduit 46, 47 is closed by a bottom member 71, above which radial through openings 74 are provided in the sensor conduit 46, 47. The interior 72 of the end member 70 forms at the bottom a downwardly directed cone configuration 73.

In this arrangement, shoulder-like steps or recesses 56 are provided on both sides of the ring of openings 74, for receiving two pressure rings 57 whose annular lips 58 bear against each other in the closed position, while in the open position they open a flow gap $68_a$ therebetween.

The above-described valve 50 reliably prevents any flow from the conveyor conduit 10 to the secondary conduit 16 in the event of a relative drop in pressure in the latter; when a plurality of apparatuses for controlling the feed of air are arranged on the conveyor conduit 10, with a common secondary conduit 16, the function thereof can be adversely affected as the pressure in the conveyor conduit 10 drops from the beginning thereof towards its end. If an apparatus at the end of the conveyor conduit 10 opens simultaneously with an apparatus in the region of the beginning thereof, then the pressure obtaining at the end of the conveyor conduit is reduced. Without the valve 50, air would now flow in the region of the beginning of the conveyor conduit, from the conveyor conduit 10 through the apparatus into the secondary conduit 16.

I claim:

1. An apparatus for pneumatically conveying material comprising a conveyor conduit for conveying said material, secondary conduit means for supplying gas under pressure to said conveyor conduit, at least one connecting conduit means for feeding gas under pressure from said secondary conduit to said conveyor conduit, valve means provided in said connecting conduit and selectively movable between a closed position and an open position for controlling the flow of gas under pressure to said conveyor conduit, first sensing means associated with said valve means for sensing the pressure in said conveyor conduit upstream of said connecting conduit ($P_1$) and second sensing means associated with said valve means for sensing the pressure in said conveyor conduit downstream of said connecting conduit ($P_2$) such that said valve means moves from its closed position to its open position when pressure $P_1$ rises and $P_1$ is greater than $P_2$.

2. Apparatus according to claim 1 wherein said valve means includes a slider mounted in a longitudinal bore provided in a valve housing, said slider having first and second piston bodies, said first sensing means includes a sensor conduit for communicating said first piston body with said conveyor conduit upstream of said connecting conduit and said second sensing means includes a sensor conduit for communicating said second piston body with said conveyor conduit downstream of said connecting conduit.

3. Apparatus according to claim 2 wherein each of said sensor conduits of said first and second sensing means is provided with an axial bore for communicating said sensor conduits with said connecting conduit upstream of said slider between said slider and said secondary conduit.

4. Apparatus according to claim 3 wherein each of said axial bores includes a throttle section.

5. Apparatus according to claim 2 wherein said first and second piston bodies are connected at a spacing (i) by a portion of narrower cross-section and energy storage means acts on said second piston body wherein the portion of narrower cross-section opens the communication between said secondary conduit and said conveyor conduit in the open position of the valve means.

6. Apparatus according to claim 5 wherein in the open position the portion of narrower cross-section is moved in a position in which it is moved towards the energy storage means.

7. Apparatus according to claim 1 wherein the connecting conduit comprises a first portion upstream of the valve means and a second portion downstream of the valve means and are displaced relative to each other in the longitudinal bore by an axial amount (q) which is smaller than the axial length (i) of the slider portion of narrower cross-section.

8. Apparatus according to claim 2 wherein the piston bodies are connected by an axial slider bar which defines with the longitudinal bore an annular chamber.

9. Apparatus according to claim 8 wherein the connecting conduit coming from the conveyor conduit in the closed position of the valve means opens into the annular space and the portion of the connecting conduit coming from said secondary conduit is closed by a piston body.

10. Apparatus according to claim 5 wherein the longitudinal bore extends in a housing block and is closed off by end plates provided with end connections to the sensor conduits.

11. Apparatus according to claim 10 wherein one end plate serves as a support means for the energy storage means and the latter projects into a blind bore provided in the adjacent piston body.

12. Apparatus according to claim 2 wherein the sensor conduits open into the conveyor conduit at different axial spacings relative to the connecting conduit.

13. Apparatus according to claim 2 wherein valves are disposed in the sensor conduits.

14. Apparatus according to claim 4 wherein the throttle sections have a diameter of about 1 mm.

15. Apparatus according to claim 13 wherein the valves in said sensor conduits have at least one lip which is associated with a gap in said valve which is adapted to be closed by said lip.

16. Apparatus according to claim 15 wherein the lip is integrally connected to an elastic ring and, in the rest position, is inclined outwardly at an angle (w) relative to a radial plane of the ring.

17. Apparatus according to claim 16 wherein the lip is formed on the ring and is biased from the ring by a wedge-shaped gap.

18. Apparatus according to claim 17 wherein the terminal edge of the lip lies outside the surface of the ring.

19. Process for pneumatically conveying material in a tubular conveyor conduit into which pressure gas is selectively introduced from a secondary conduit via a connecting conduit provided with a valve which is selectively positioned between a closed position and an open position comprising the steps of sensing the pressure in the conveyor conduit upstream and downstream of the connecting conduit so as to obtain an upstream pressure $P_1$ and downstream pressure $P_2$ and positioning said in $P_1$ wherein $P_1$ is greaater than $P_2$ whereby pressure gas valve within said connecting conduit from its closed position to its open position upon sensing a rise from said secondary conduit is fed through said connecting conduit and into said conveyor conduit.

20. A process according to claim 19 including the steps of biasing said valve to its closed position when $P_1$ is substantially equal to $P_2$.

* * * * *

UNITED STATES PATENT AND TRADEMARK OFFICE
CERTIFICATE OF CORRECTION

PATENT NO. : 4,955,761
DATED : September 11, 1990
INVENTOR(S) : Bernd Federhen, Manfred May It is certified that error appears in the above-identified patent and that said Letters Patent is hereby corrected as shown below:

Column 8, lines 52-53, after "said" delete "in $P_1$ wherein $P_1$ is greater than $P_2$ whereby pressure gas"

Column 8, line 54, after "rise" insert --in $P_1$ wherein $P_1$ is greater than $P_2$ whereby pressure gas from--.

Column 8, line 51, before "downstream" insert --a--.

Signed and Sealed this

Ninth Day of June, 1992

Attest:

DOUGLAS B. COMER

*Attesting Officer*   *Acting Commissioner of Patents and Trademarks*